(12) United States Patent
Ozaki

(10) Patent No.: US 11,541,535 B2
(45) Date of Patent: Jan. 3, 2023

(54) ROBOT CONTROL DEVICE

(71) Applicant: FANUC CORPORATION, Yamanashi (JP)

(72) Inventor: Shunichi Ozaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 17/003,183

(22) Filed: Aug. 26, 2020

(65) Prior Publication Data

US 2021/0078171 A1   Mar. 18, 2021

(30) Foreign Application Priority Data

Sep. 18, 2019   (JP) .............................. JP2019-169252

(51) Int. Cl.
*B25J 9/16* (2006.01)
*B25J 13/06* (2006.01)
*G05B 19/4155* (2006.01)

(52) U.S. Cl.
CPC ............ *B25J 9/1651* (2013.01); *B25J 13/06* (2013.01); *G05B 19/4155* (2013.01); *G05B 2219/34016* (2013.01); *G05B 2219/50391* (2013.01)

(58) Field of Classification Search
CPC .......... B25J 9/1651; B25J 13/06; B25J 13/02; G05B 2219/34016; G05B 2219/35459; G05B 2219/43186; G05B 2219/39195; G05B 2219/36162; G05B 19/416; G05B 11/26; G05B 19/42; G05B 19/4155; G05B 11/28; G05B 11/30
See application file for complete search history.

(56) References Cited

U.S. PATENT DOCUMENTS

| 2005/0283275 A1* | 12/2005 | Tokutake | ............... B25J 9/1656 700/264 |
| 2012/0035769 A1* | 2/2012 | Lin | ...................... G05B 19/042 700/275 |
| 2016/0288442 A1* | 10/2016 | Suzuki | .................... B30B 15/26 |
| 2020/0259444 A1* | 8/2020 | Aoki | ........................ H02P 6/16 |

FOREIGN PATENT DOCUMENTS

| JP | H02-280202 A | 11/1990 | |
| JP | H04-354683 A | 12/1992 | |
| JP | H09288517 A * | 11/1997 | ............... B23Q 5/22 |
| JP | 2960292 B | 10/1999 | |
| JP | 2014-097560 A | 5/2014 | |
| JP | WO2017195362 A1 * | 5/2018 | ........... G05B 19/042 |

* cited by examiner

*Primary Examiner* — Khoi H Tran
*Assistant Examiner* — Tanner L Cullen
(74) *Attorney, Agent, or Firm* — Maier & Maier, PLLC

(57) ABSTRACT

A robot control device includes manual pulse generation units that generate pulses having a pulse number depending on an operation amount of an operator, command signal calculation units that calculate an operation command signal to a robot based on a pulse number to be input, and a pulse number limiting unit that limits, to a threshold, the pulse number to be input into the command signal calculation units, in a case or cases where the pulse number generated by the manual pulse generation units is larger than the predetermined threshold, where, in a case or cases where the pulse number generated by the manual pulse generation units is equal to or less than the threshold, the pulse number is output as it is.

1 Claim, 6 Drawing Sheets

ROBOT CONTROL DEVICE

CROSS-REFERENCE TO RELATED APPLICATIONS

This application claims the benefit of Japanese Patent Application No. 2019-169252, the content of which is incorporated herein by reference.

FIELD

The present disclosure relates to a robot control device.

BACKGROUND ART

A robot control method and a control device are known in which an operator manually operates a manual pulse generation device to operate a robot (e.g., see Japanese Unexamined Patent Application, Publication No. Hei 4-354683).

According to this control method, even if an operation speed of the manual pulse generation device noticeably fluctuates, the robot can be smoothly accelerated and decelerated.

SUMMARY

An aspect of the present disclosure provides a robot control device including a manual pulse generation unit that generates pulses having a pulse number depending on an operation amount of an operator, a command signal calculation unit that calculates an operation command signal to a robot based on a pulse number to be input, and a pulse number limiting unit that limits, to a predetermined threshold, the pulse number to be input into the command signal calculation unit, in case where the pulse number generated by the manual pulse generation unit is larger than the predetermined threshold.

DETAILED DESCRIPTION

Hereinafter, description will be made as to a robot control device 1 according to an embodiment of the present disclosure with reference to the drawings.

Figure 1:
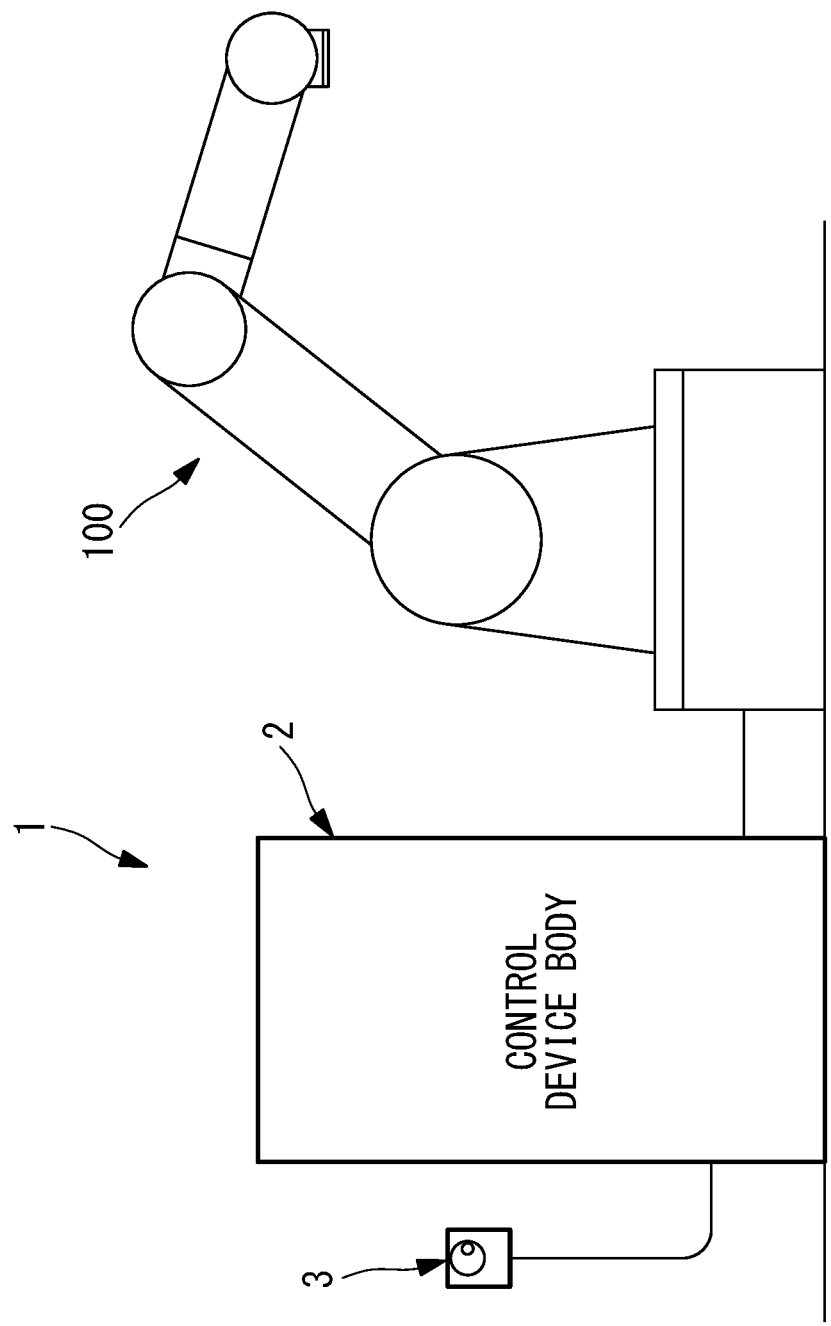
FIG. 1 is an entire configuration diagram showing a system including a robot control device according to an embodiment of the present disclosure.

As shown in FIG. 1, the robot control device 1 according to the present embodiment includes a control device body 2 connected to a robot 100 to control the robot 100 based on an operation program taught in advance, and a manual pulse generation device 3 connected to the control device body 2.

As the robot 100, a robot of an arbitrary configuration may be employed, and here, a 6-axis articulated type robot is illustratively described.

Figure 2:
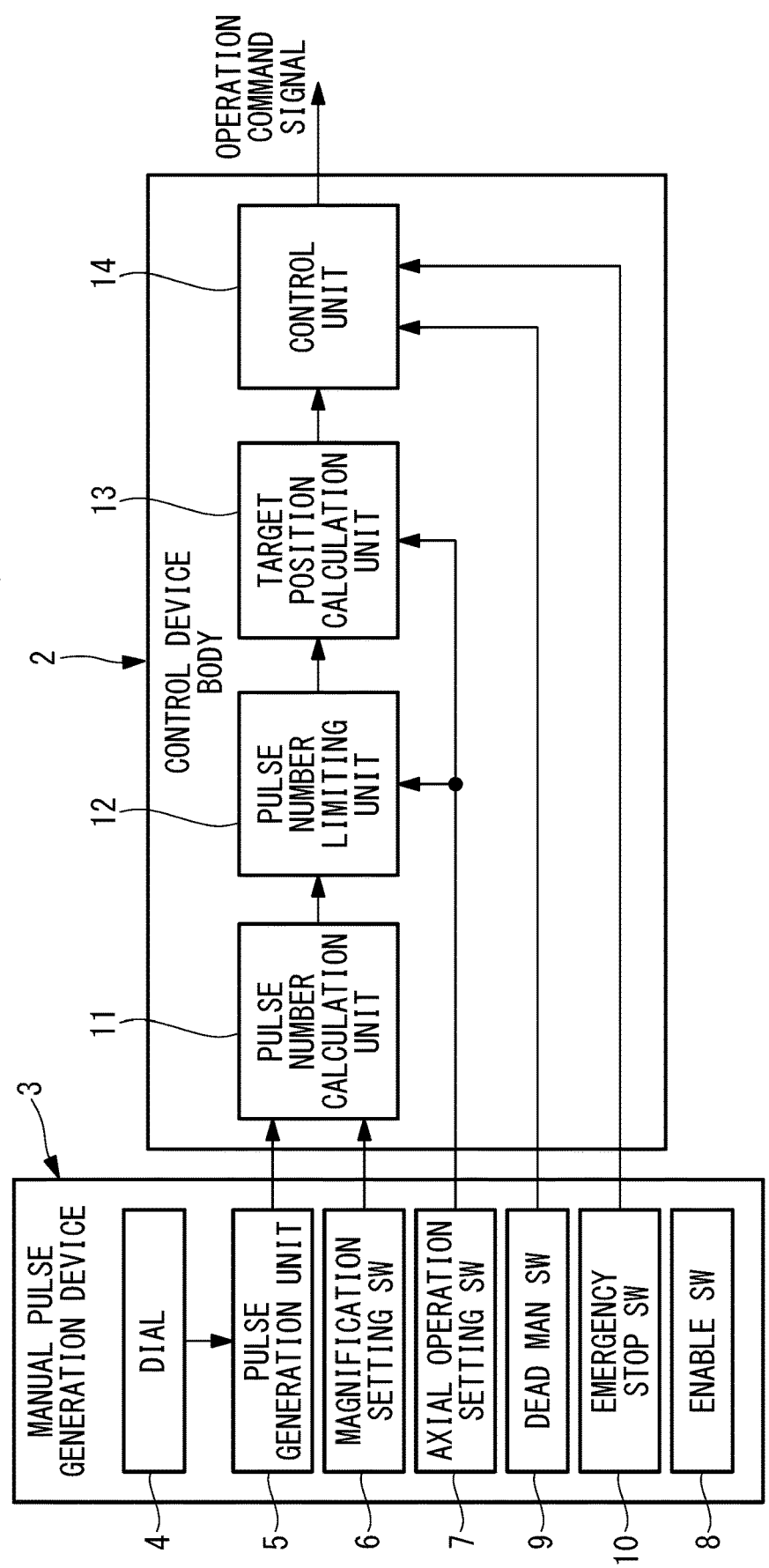
FIG. 2 is a block diagram showing the robot control device of FIG. 1.

As shown in FIG. 2, the manual pulse generation device 3 includes a dial (a manual pulse generation unit) 4 rotatable in opposite directions by an operator's operation, and a pulse generation unit (a manual pulse generation unit) 5 connected to the dial 4 to generate a number of pulses depending on a rotation angle of the dial 4.

Furthermore, the manual pulse generation device 3 includes a magnification setting SW (a manual pulse generation unit) 6 that selects a pulse magnification, an axial operation setting SW 7 that selects an operation method of an axis, and an enable SW 8 that switches an operation of the manual pulse generation device 3 to be enabled or disabled. Additionally, the manual pulse generation device 3 includes a dead man SW 9 and an emergency stop SW 10.

The magnification setting SW 6 is, for example, switchable to select the pulse magnification from three magnifications of one time, 10 times, and 100 times.

In case where the robot 100 is the 6-axis articulated type robot, the axial operation setting SW 7 is settable either to six switch positions to select the axis to be operated or to a switch position to link a plurality of axes and linearly operate a tool tip point.

The control device body 2 includes a processor and a memory, and includes a pulse number calculation unit (a manual pulse calculation unit) 11, a pulse number limiting unit 12, a target position calculation unit (a command signal calculation unit) 13, and a control unit (a command signal calculation unit) 14.

The pulse number calculation unit 11 is connected to the pulse generation unit 5 and the magnification setting SW 6 of the manual pulse generation device 3. The pulse number calculation unit 11 samples a pulse number generated by the pulse generation unit 5 in response to an operation of the dial 4 every predetermined time interval $\Delta t$, and multiplies the sampled pulse number by the pulse magnification selected by the magnification setting SW 6 to calculate the pulse number.

The pulse number limiting unit 12 is connected to the pulse number calculation unit 11 and the axial operation setting SW 7 of the manual pulse generation device 3, and determines whether or not the pulse number calculated in the pulse number calculation unit 11 is larger than a predetermined threshold TH. The threshold TH is set to a value equal to the pulse number for the control unit 14 to output an operation command signal corresponding to a maximum operation speed of each axis of the robot 100 in case where the manual pulse generation device 3 is enabled by the enable SW 8, and the threshold is stored for each axis.

Figure 3:
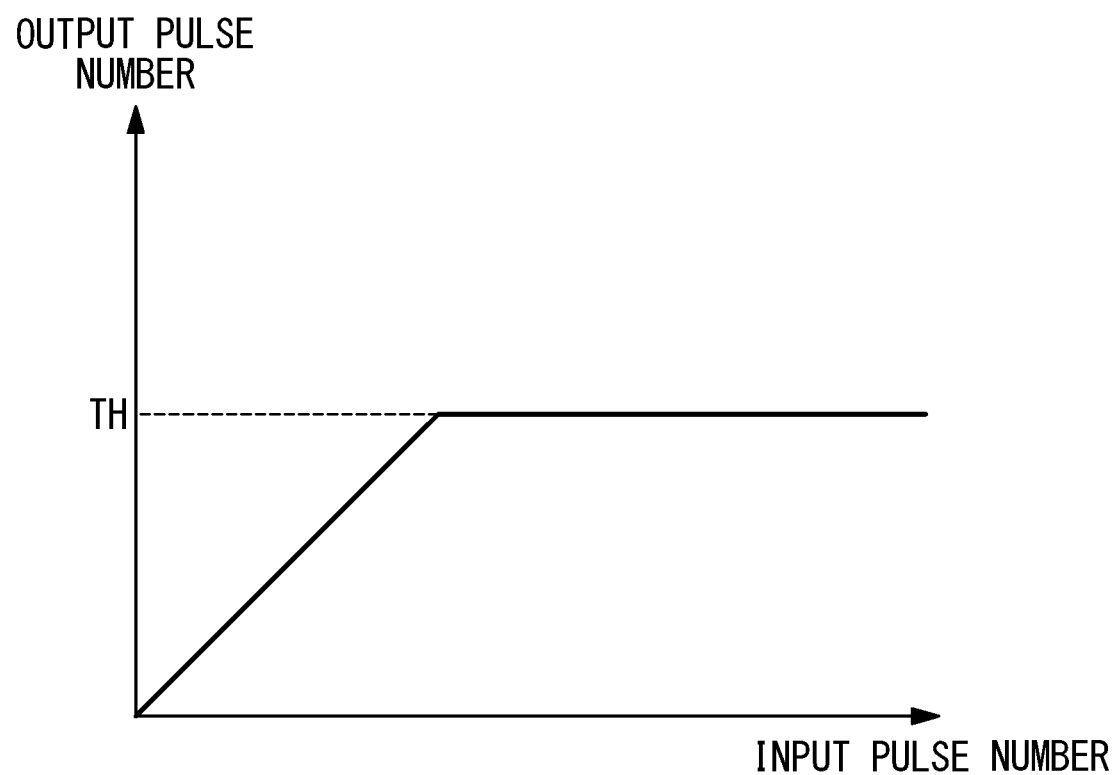
FIG. 3 is a diagram showing a relation between an input pulse number and an output pulse number to explain a pulse number limiting unit of the robot control device of FIG. 2.

As a result, as shown in FIG. 3, in case where the pulse number input from the pulse number calculation unit 11 is equal to or less than the threshold TH, the pulse number limiting unit 12 outputs the input pulse number as it is. On the other hand, in case where the pulse number input from the pulse number calculation unit 11 is larger than the threshold TH, the pulse number limiting unit 12 outputs the threshold TH as the pulse number.

The target position calculation unit 13 is connected to the pulse number limiting unit 12 and the axial operation setting SW 7 of the manual pulse generation device 3. The target position calculation unit 13 calculates a target position to move the tool tip point in a direction prescribed by the operation method selected by the axial operation setting SW 7, based on the pulse number output from the pulse number limiting unit 12.

The control unit 14 is connected to the target position calculation unit 13, and the axial operation setting SW 7, the dead man SW 9 and the emergency stop SW 10 of the manual pulse generation device 3.

The control unit 14 calculates the operation command signal of each axis to operate the robot 100 by the operation method selected by the axial operation setting SW 7, at a new target position calculated by the target position calculation unit 13, and the control unit outputs the signal to the robot 100.

Hereinafter, description will be made as to a case where the robot 100 is operated by the operator who uses the manual pulse generation device 3, according to the robot control device 1 of the present embodiment including such a configuration as described above.

In the present embodiment, the operator grips the manual pulse generation device 3, holds the dead man SW 9, releases the emergency stop SW 10, and switches the enable SW 8 to enable the device.

In this state, the pulse magnification is selected with the magnification setting SW 6, and the operation method is selected with the axial operation setting SW 7. The selected pulse magnification and operation method are transmitted to the control device body 2.

Then, the dial 4 is rotated in one direction or the other direction. Consequently, pulses having a pulse number depending on the rotation angle of the dial 4 are generated in the pulse generation unit 5, and transmitted to the control device body 2.

In the control device body 2, first, in the pulse number calculation unit 11, the pulse number generated in the pulse generation unit 5 is sampled in response to the operation of the dial 4 every predetermined time interval $\Delta t$, and is multiplied by the pulse magnification selected by the magnification setting SW 6 to calculate the pulse number.

Next, it is determined in the pulse number limiting unit 12 whether or not the pulse number calculated by the pulse number calculation unit 11 is larger than the threshold TH. In the pulse number limiting unit 12, in case where the pulse number is equal to or less than the threshold TH, the pulse number is output as it is, and in case where the pulse number is larger than the threshold TH, the threshold TH is output as the pulse number.

Then, in the target position calculation unit 13, the target position to move the tool tip point is calculated based on the pulse number output from the pulse number limiting unit 12 and the operation method selected by the axial operation setting SW 7. The control unit 14 calculates the operation command signal of each axis to operate the robot 100 by the operation method selected by the axial operation setting SW 7, at a new target position calculated by the target position calculation unit 13, and the control unit outputs the signal to the robot 100. Consequently, the robot 100 is operated in response to the operation command signal.

In this case, as the operator increases the pulse magnification selected by the magnification setting SW 6 or the operator rotates the dial 4 at higher speed, the pulse number calculated in the pulse number calculation unit 11 every predetermined time interval $\Delta t$ increases. If the pulse number input into the target position calculation unit 13 is large, a distance from the current position to the calculated target position increases.

According to the robot control device 1 of the present embodiment, if the pulse number calculated in the pulse number calculation unit 11 is equal to or less than the predetermined threshold TH, the calculated pulse number is input as it is into the target position calculation unit 13. Consequently, in the target position calculation unit 13, the target position having the distance of a magnitude proportional to the rotation angle of the dial 4 is calculated. Then, in the control unit 14, calculated is the operation command signal to operate the robot 100 at speed obtained by dividing the distance to the calculated target position by the time interval $\Delta t$.

On the other hand, in case where the pulse number calculated in the pulse number calculation unit 11 is larger than the threshold TH, the threshold TH is input as the pulse number into the target position calculation unit 13. Consequently, in the target position calculation unit 13, the target position is calculated using the threshold TH, irrespective of the rotation angle of the dial 4. Then, in the control unit 14, calculated is the operation command signal to operate the robot 100 at the speed obtained by dividing the distance to the calculated target position by the time interval $\Delta t$. The speed in this case matches the maximum operation speed of the robot 100 in case where the manual pulse generation device 3 is operated.

That is, no matter how fast the operator rotates the dial 4, the calculated operation command signal does not indicate such a value as to operate the robot 100 at an operation speed in excess of the maximum operation speed. Consequently, if the operator stops the operation of the dial 4, the robot 100 can be quickly stopped, and if the dial 4 is reversed, the robot 100 can be quickly moved in a reverse direction.

Consequently, according to the robot control device 1 of the present embodiment, there is an advantage that the robot 100 can more quickly follow the operation of the manual pulse generation device 3 that suddenly stops the dial 4 that has rotated at the high speed, or reverses the dial. Furthermore, the maximum operation speed in operating the manual pulse generation device 3 can be kept sufficiently low, and hence the operation of the robot 100 can be prevented from being vibratory or being at dangerous speed.

Furthermore, in case where the dial 4 is rotated at low speed, the rotation angle of the dial 4 linearly corresponds to a movement amount of the robot 100, and hence operability is suitable. That is, even if the dial 4 is not much rotated, it is possible to be operated at the high speed.

Here, in case where the dial 4 is rotated at the high speed, the operation speed of the robot 100 is limited to a constant speed irrespective of the rotation angle of the dial 4. Consequently, in that sense, it cannot be considered that the operation of the robot 100 follows the operation of the dial 4. However, the faster the dial 4 is rotated, the more difficult it is for the operator to notice that the rotation angle of the dial 4 does not linearly correspond to the movement amount of the robot 100. Consequently, the operability does not deteriorate.

Note that in the present embodiment, the following modification or change can be performed.

Firstly, as the threshold TH for use in the pulse number limiting unit 12, employed is the value equal to the pulse number at which the operation command signal calculated in the control unit 14 corresponds to the maximum operation speed of the robot 100 during the operations of the manual pulse generation units 4, 5 and 6, but the present disclosure is not limited to this example.

For example, if the value approximates the pulse number that corresponds to the maximum operation speed, a value smaller or larger than the pulse number may be employed.

Figure 4:
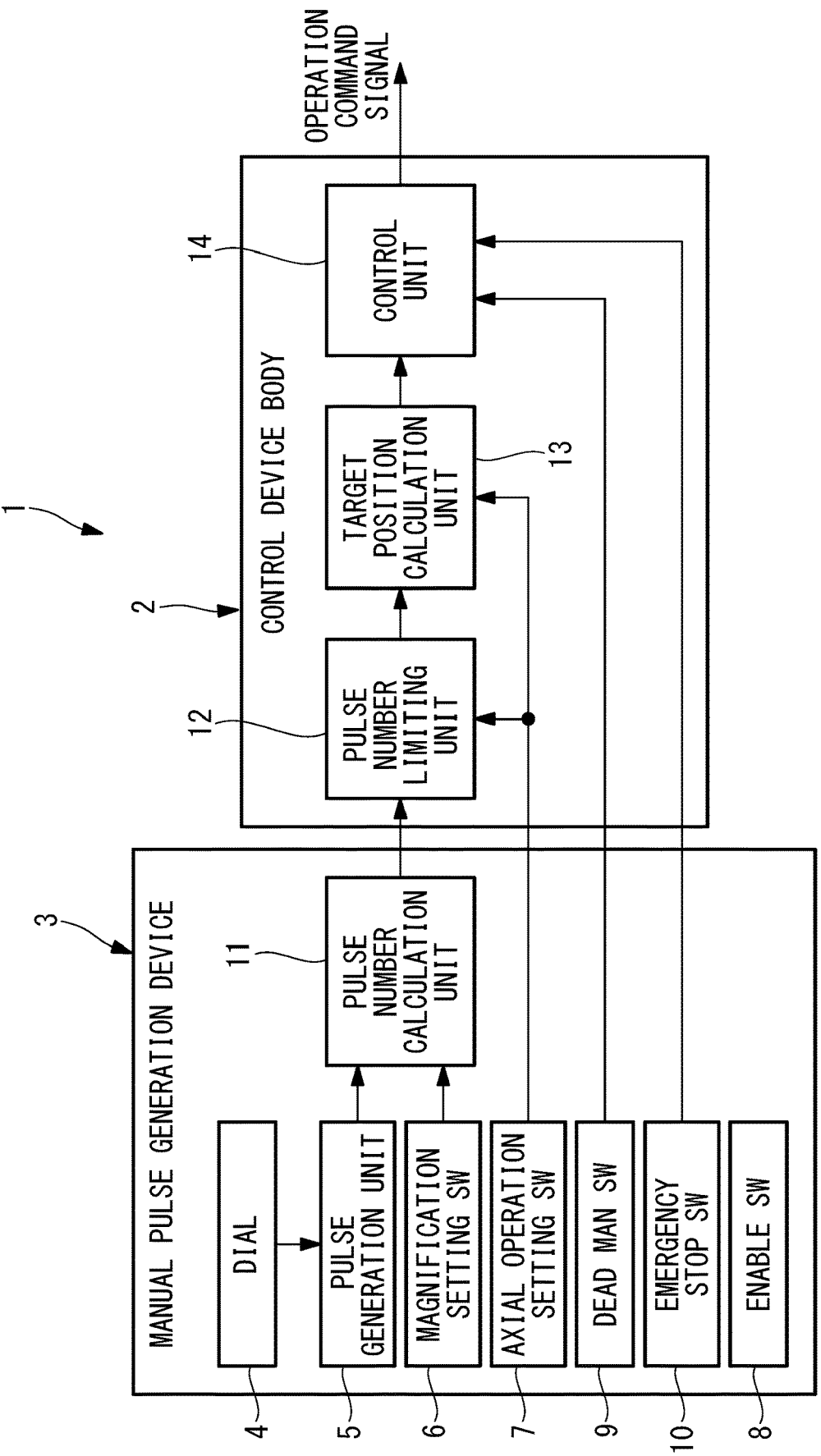
FIG. 4 is a block diagram showing a modification of the robot control device of FIG. 2.
Figure 5:
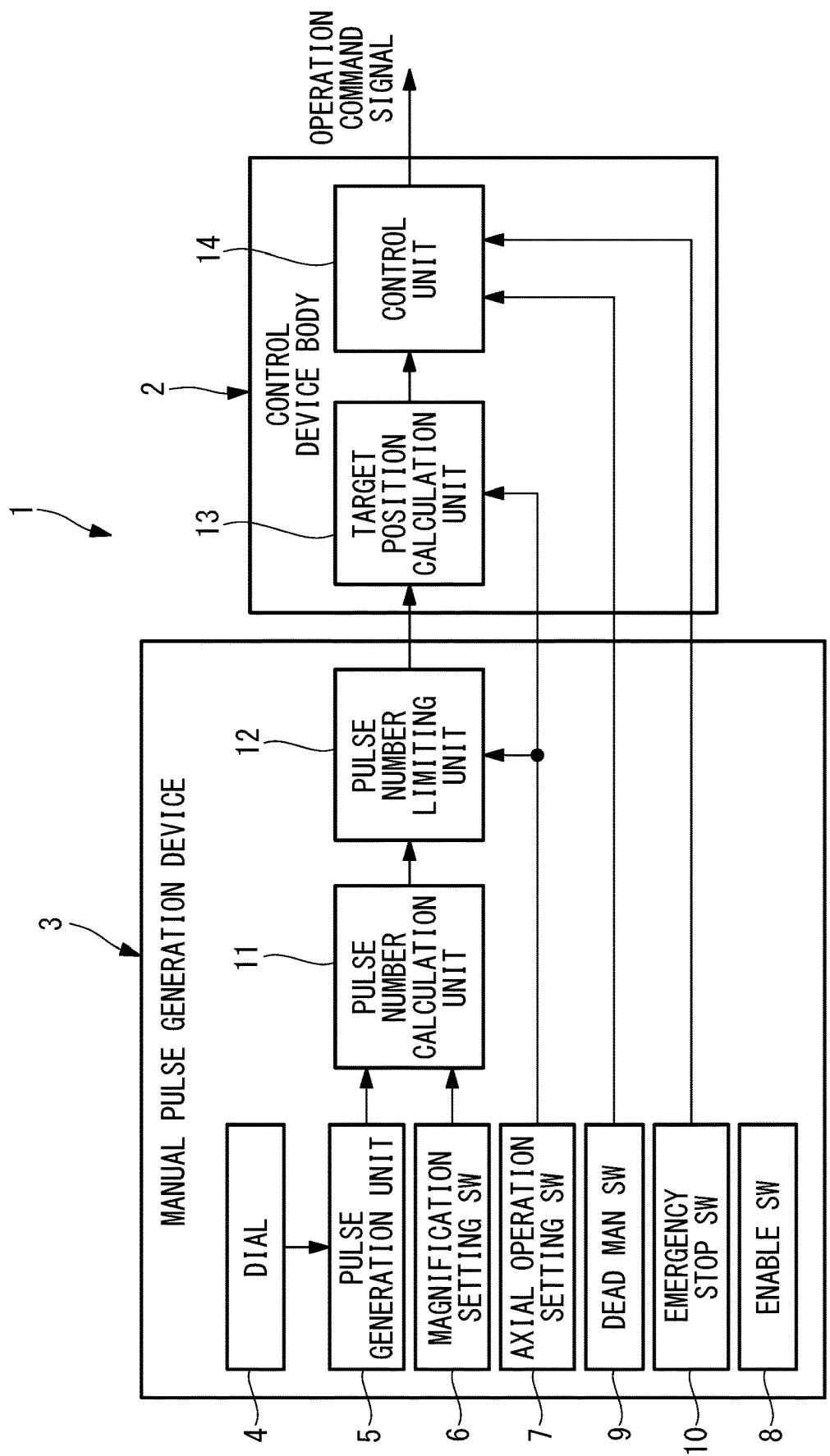
FIG. 5 is a block diagram showing another modification of the robot control device of FIG. 2.

Furthermore, in the present embodiment, the pulse number calculation unit 11 and the pulse number limiting unit 12 are arranged in the control device body 2. Alternatively, as shown in FIG. 4, the pulse number calculation unit 11 may be disposed in the manual pulse generation device 3, or as shown in FIG. 5, the pulse number calculation unit 11 and the pulse number limiting unit 12 may be arranged in the manual pulse generation device 3.

Figure 6:
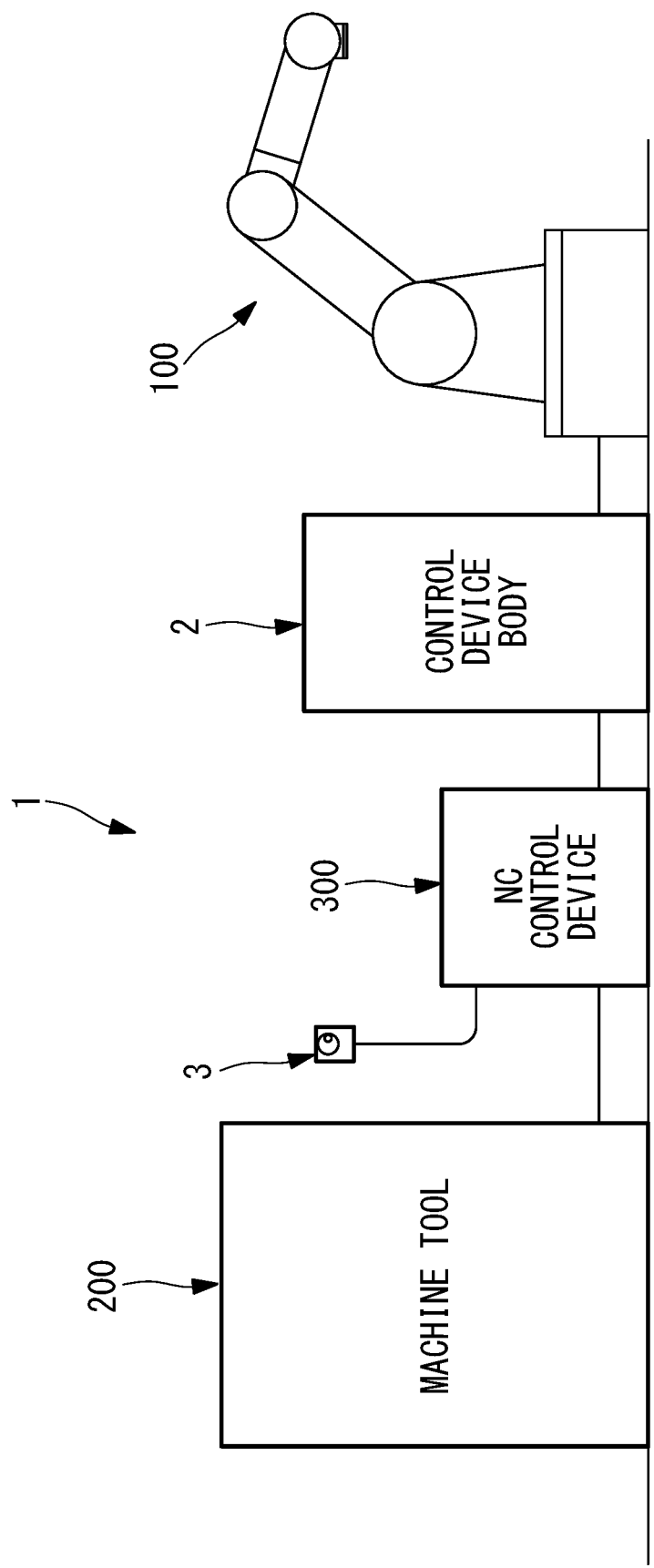
FIG. 6 is a block diagram showing a modification of the system of FIG. 1.

Furthermore, a case where the manual pulse generation device 3 is connected to the control device body 2 that only controls the robot 100 as the robot control device 1 has been illustrated, but as shown in FIG. 6, the manual pulse generation device 3 may be connected to an NC control device 300 connected to a machine tool 200 and the control device body 2.

Additionally, a case where the manual pulse generation device 3 generates pulses having the pulse number depending on the rotation angle of the dial 4 has been illustrated. Alternatively, pulses having a pulse number depending on a slide amount of a slider may be generated.

The invention claimed is:

1. A robot control device that operates a robot, comprising:
   a pulse generator that receives an operation by an operator and that generates a first pulse number depending on the received operation;
   a processor that is configured to sample the first pulse number at a predetermined time interval to calculate a second pulse number, the second pulse number corresponding to an operation speed of the robot, the operation speed being calculated from a distance to a target position when the robot is operated and the predetermined time interval; and
   a memory that stores a third pulse number corresponding to a maximum value of the operation speed, the maximum value being preliminarily determined,
   wherein the processor is configured to:
   determine whether or not the second pulse number is greater than the third pulse number;
   in response to determining that the second pulse number is equal to or less than the third pulse number, set a position which is calculated based on the second pulse number as the target position; and
   in response to determining that the second pulse number is larger than the third pulse number, set a position which is calculated based on the third pulse number as the target position.

* * * * *